(12) United States Patent
Sobhani

(10) Patent No.: US 9,374,331 B2
(45) Date of Patent: *Jun. 21, 2016

(54) TIME-MANAGED ELECTRONIC MAIL MESSAGES

(71) Applicant: Microsoft Technology Licensing, LLC, Redmond, WA (US)

(72) Inventor: Dolly Sobhani, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/549,288

(22) Filed: Nov. 20, 2014

(65) Prior Publication Data

US 2015/0081821 A1 Mar. 19, 2015

Related U.S. Application Data

(63) Continuation of application No. 13/400,242, filed on Feb. 20, 2012, now Pat. No. 8,930,474.

(51) Int. Cl.
 G06F 15/16 (2006.01)
 H04L 12/58 (2006.01)

(52) U.S. Cl.
 CPC ............... H04L 51/14 (2013.01); H04L 51/18 (2013.01); H04L 51/22 (2013.01)

(58) Field of Classification Search
 CPC ........................................ H04L 51/22
 USPC .......................... 709/206, 205, 248
 See application file for complete search history.

(56) References Cited

U.S. PATENT DOCUMENTS

2002/0026487 A1 2/2002 Ogilvie et al.
(Continued)

FOREIGN PATENT DOCUMENTS

| EP | 2362592 A1 | 8/2011 |
| GB | 2350711 A | 12/2000 |
| KR | 10-2003-0055817 A | 7/2003 |

OTHER PUBLICATIONS

"International Search Report", Mailed Date: May 27, 2013, Application No. PCT/US2013/025653, Filed Date: May 27, 2013, pp. 11.
"PosteCS—Secure Email", Retrieved on: Nov. 15, 2011, 1 Available on: http:/f.N.Nvv.canadapost.ca/cpo/mc/business/productsservices/mailing/postecs.jsf.

(Continued)

*Primary Examiner* — David Lazaro
*Assistant Examiner* — Marie Georges Henry
(74) *Attorney, Agent, or Firm* — Damon Rieth; Tom Wong; Micky Minhas

(57) ABSTRACT

Systems, method sand computer program products for facilitating the automatic deletion of received emails after a user-selectable time period has elapsed are disclosed. In various embodiments, email messages contain a header field referred to as an "Expiration Time" header field that dictates the length of time the email will reside in a designated Inbox prior to its automatic deletion by an email server. The server is able to automatically delete the received email as long as the email is residing in a folder that is synched to the server. A user receiving the email has access to the Expiration Time Header field and can modify its value if desired and allowed by the sender. The user can move the retrieved email to a folder that is not synched to the server, thus preventing the email from being automatically deleted by the server.

20 Claims, 4 Drawing Sheets

(56) References Cited

U.S. PATENT DOCUMENTS

| | | | |
|---|---|---|---|
| 2003/0131060 A1 | 7/2003 | Hartselle et al. | |
| 2003/0229668 A1 | 12/2003 | Malik | |
| 2005/0144246 A1* | 6/2005 | Malik | 709/206 |
| 2006/0149822 A1 | 7/2006 | Henry et al. | |
| 2008/0016575 A1 | 1/2008 | Vincent et al. | |
| 2009/0177704 A1 | 7/2009 | Consul et al. | |
| 2010/0064172 A1* | 3/2010 | George et al. | 714/15 |
| 2010/0149300 A1 | 6/2010 | Zubas et al. | |
| 2010/0287249 A1* | 11/2010 | Yigang et al. | 709/206 |

OTHER PUBLICATIONS

"Understanding Transport Queues", Retrieved on: Nov. 15, 2011, Available on http://technet.microsoft.com/en-usllibrary/bb125022(printer).aspx.

"Search Report Received for European Patent Application No. 13751652.2", Mailed Date: Sep. 18, 2015, 7 Pages.

"Office Action Issued in Russian Patent Application No. 2014134048", Mailed Date: Sep. 19, 2014, 3 Pages. (w/o English Translation).

* cited by examiner

TIME-MANAGED ELECTRONIC MAIL MESSAGES

CROSS-REFERENCE TO RELATED APPLICATION(S)

This application is a continuation application of U.S. patent application Ser. No. 13/400,242, filed Feb. 20, 2012, the disclosure of which is incorporated herein in its entirety.

FIELD OF THE INVENTION

The present invention generally relates to data communications and more particularly to systems, methods and computer program products for transmitting and receiving electronic mail.

BACKGROUND

In today's technological environment, people often communicate with each other via electronic mail ("email") using portable computing and communication devices, laptop computers, desktop computers and other communication devices. Communication via email has become so commonplace that a single individual may have several email addresses. Businesses and generally commercial organizations, non-profit organizations and virtually every other type of organization use emails as a way to promote their products and/or services, and to inform the public or a selected subset of the public of their products, services or organizational goals. As a result, individuals are inundated with emails on a daily basis. Most of the received emails, or at least a substantial portion of the received emails, are advertisements targeting a particular demographic where such emails are, in essence, ads promoting sales of particular products/services for a specific time period after which the product/service may no longer be available or the promotion may no longer be valid.

Users of email typically have email software that is installed on a computer or a mobile telephone that allows the users to compose emails in accordance with well-known and accepted email communication standards and protocols. Such email software has at least an Inbox in which received emails are stored and are accessible for viewing by the user. For many users, the number of emails received during a typical business day may be in the dozens. At some point a user has to review the contents of the Inbox to remove large numbers of dated, unwanted and irrelevant emails from the user's cluttered Inbox. Also, there are instances in which a sender of an email may desire that the email, once received by the intended recipient, be deleted within a particular period of time. Such emails may contain sensitive privileged and/or confidential information and that it may be desirable to the senders of these emails to limit the length of time such emails reside in a receiving server or within the Inbox of the intended recipient. Further, commercial organizations that perform mass transmissions of emails are probably aware that there may be several of their previous emails in a recipient's Inbox and that at some point all of these emails will be deleted by the recipient without even checking for the latest of such emails that may still be relevant. It would be desirable for such mass emailers to have their dated emails deleted at some point so that consumers can focus on the more recent emails proffering the latest sales/promotional ads.

SUMMARY

This summary is provided to introduce a selection of concepts. These concepts are further described below in the Detailed Description section. This summary is not intended to identify key features or essential features of the claimed subject matter, nor is this summary intended as an aid in determining the scope of the claimed subject matter.

The present disclosure meets the above-identified needs by providing systems, methods and computer program products for facilitating the automatic (i.e., with no user interaction) deletion of received emails after a user-selectable time period has elapsed. The user-selectable time period can be set by the sender of the email and can be modified or reset by the recipient of the email. An input field of the email called "Expiration Time" is provided in the header section of the email and corresponding metadata information and commands as per email transmission and email retrieval communication protocols are also included in the composed email to effectuate the automatic deletion of the email. The value of the Expiration Time header will indicate the length of time the email is allowed to reside in an intended ultimate destination server before the server automatically deletes the received email.

In one embodiment, the present disclosure provides systems, methods and computer program products that allow a user to compose an email message including selectively setting an Expiration Time value in a particular header field of the email being composed. In particular, with the use of user equipment or a server, the systems, methods and computer program products of the present disclosure provide an email format structured to include a user accessible header field called Expiration Time. The user is able to enter a numeric value for the Expiration Time header field. Using an email software (commercially available or a custom software package) installed onto the user processor that engages or is merged with programmed instructions, the user is able to compose the email including entering a value for the Expiration Time header field. The composed email (i.e., the email message) comprises an email header section, an email body, metadata information and commands as per email transmission and retrieval protocols.

The email is transmitted as per the email transmission protocol and thus the various commands, metadata information, handshaking procedures and other procedures on how to route the email between various communication nodes (e.g., mail exchange servers) are included as part of the email message. The email is received ultimately by a server of the intended recipient and such email will reside in the receiving server until its Expiration Time has elapsed, at which point the receiving server automatically deletes the email. When there is no entry for the Expiration Time, its value assumes a default value. The default value can be set by the sending user or be a pre-set value.

Further features and advantages of the present disclosure, as well as the systems, methods and computer program product of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

The present disclosure meets the above-identified needs by providing systems, methods and/or computer program products for facilitating the automatic deletion of received emails after a user-selectable time period has elapsed. At a transmit end, the user-selectable time period can be set by a sender of an email and can be modified or reset by the recipient of the email. An input header field of the email called Expiration Time is provided in the header section of the email and, in accordance with a protocol being followed, corresponding metadata information, commands and protocol routing procedures are also included in the composed email to effectuate the proper routing of the email and its automatic deletion at the proper time. The value of the Expiration Time header will indicate the length of time the email is allowed to reside in an intended ultimate destination server after which the server automatically deletes the email. The systems, methods and/or computer program products of the present disclosure may reside in the server or may reside in another location in communication with the server.

Figure 1:
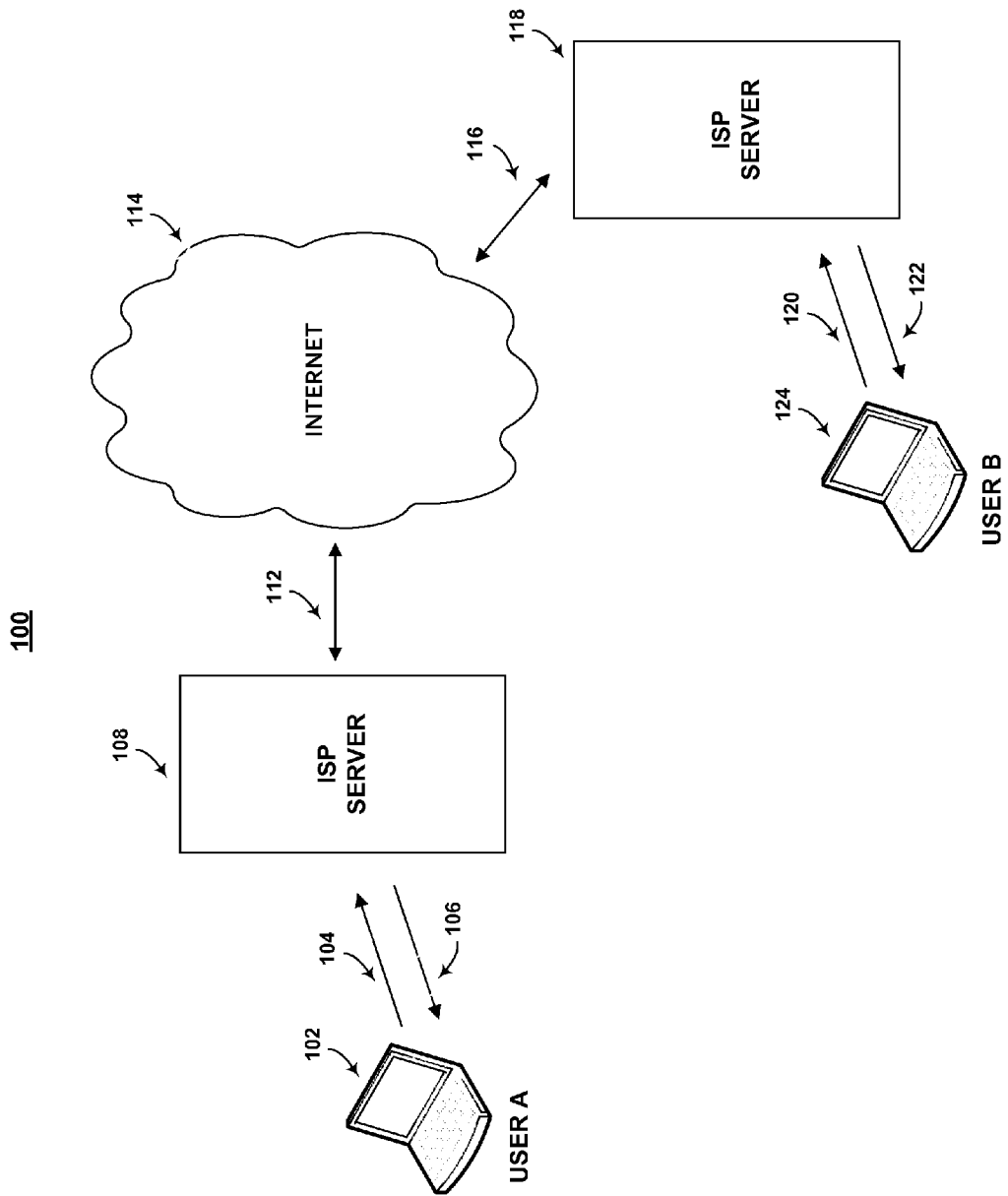
FIG. 1 is a block diagram of an exemplary computer system providing the environment and context for implementing the present disclosure.

Referring to FIG. 1 there is shown an exemplary communication environment 100 depicting two users (user A, user B) and communication infrastructure for exchanging email messages. For the sake of simplicity and clarity of explanation, the present disclosure will be described in the context of FIG. 1 where user A is transmitting an email message to user B using user equipment 102 and 124, respectively. One example of user equipment 102 and 124 used by the users are laptop computers with communication circuitry, such as modems. It will be noted that the particular arrangement of users and user equipment shown in FIG. 1 is for description purposes only and that FIG. 1 does not at all limit the equipment and/or their arrangement in an environment and context within which the systems, methods and/or computer program products of the present disclosure can operate.

As will be apparent to one skilled in the relevant art(s) after reading the description herein, user equipment 102 and 124 shown in FIG. 1 may be configured as any number of computing devices such as a game console, a portable media player, a desktop, a notebook computer, a tablet computer, a PDA, a mobile computer, a smart telephone, a mobile telephone, an intelligent communications device or the like.

Continuing with FIG. 1, laptop 102 of user A is coupled to Internet Service Provider (ISP) server 108 via a local communication loop comprising communication links 104 and 106. That is, information from laptop 102 is transmitted to ISP server 108 via communication link 104 and information is received by laptop 102 from ISP server 108 via communication link 106. Similarly, laptop 124 of user B is coupled to ISP server 118 via a local communication loop comprising communication links 120 and 122. That is, information from laptop 124 is transmitted to ISP server 118 via communication link 120 and information is received by laptop 102 from ISP server 118 via communication link 122. Depending on their respective geographical locations and the type of devices they are using to communicate with each other, user A and user B may or may not be subscribed to the same ISP.

ISP servers 108 and 118 are both connected to internet 114 via communication links 112 and 116 respectively. Internet 114 may represent not only the well-known and publicly available World Wide Web computer network (i.e., the Internet), but may be a totally proprietary computer network or it may be a partially proprietary computer network where part of it includes the World Wide Web. For ease of explanation, however, the communication network 114 is labeled and is referred to as the Internet. ISP 108 and 118 are capable of conveying (i.e., transmitting and/or receiving) email messages in accordance with one or more protocols for transmitting emails (i.e., SMTP or Simple Mail Transfer Protocol) and retrieving emails (IMAP: Internet Message Access Protocol or POP: Post Office Protocol). In the example being discussed, the systems, methods and/or computer products of the present disclosure will be described in the context of the SMTP and IMAP. It will be readily understood, however, that the present disclosure is not limited to be implemented and practiced in the context of these two protocols. Other protocols can be used with the systems, methods and computer program products of the present disclosure. Also, the present disclosure can be used in any version of the mentioned protocols (e.g., SMTP3, IMAP4, POPS, etc.).

For the sake of clarity of description only, the process of transmitting an email message from user A (using laptop 102) to ISP ("sending") server 108 through the Internet 114 (via one or more mail exchange servers) to ISP ("receiving") server 118 and finally to user B (received with laptop 124) will be described in the context of the SMTP and IMAP respectively.

In an embodiment, servers 108, 118 are residing therein the systems, methods and/or computer program products of the present disclosure allowing emails to be transmitted via the Internet and allowing emails to be retrieved by a user. It will be understood that an email message from user A to user B travels through Internet 114 via one or more mail exchange servers that route the email as per various Internet protocols and in accordance with the SMTP or other appropriate protocol. Further, the email is retrieved from a server as per various local communication loop protocols, Internet protocols and an email retrieval protocol, such as the IMAP. Laptops 102 and 124 have installed therein well-known publicly available commercial email reader software or computer programs (e.g., Microsoft Outlook® available from Microsoft Corporation of Redmond, Wash.) that allow a user to compose an email message as per a proper protocol (e.g., SMTP) being followed for transmitting emails and also in accordance with a protocol (e.g., IMAP) being followed for retrieving emails from a server.

The systems, methods and/or computer program products of the present disclosure can engage commercially-available software residing on laptop 102 (and laptop 124) to allow user A to compose an email that complies with the SMTP and also allows user A to practice the present disclosure. In particular, the format of an email message in accordance with the SMTP involves arranging the Email headers and body in a particular format, which also includes metadata information and commands appended to the email message, all of which are compliant with the SMTP. The systems, methods or computer program products of the present disclosure maybe implemented as laptop 102, programmed with particular instructions, and/or software that interacts with or engages the commercial email software so that an Expiration Time field is made available to user A during the composition of the email.

In the alternative, the instructions programmed into laptop 102 to implement the systems, methods and/or computer program products of the present disclosure can be merged and become integral with the installed commercial email software enabling laptop 102 to generate a properly-formatted "Expiration Time" header field during composition of the email by user A. Also, the systems, methods and/or computer program products of the present disclosure may reside on the originating and destination servers (108, 118) to allow the servers to operate as per a protocol (e.g., SMTP and IMAP) and transfer the email message including the Expiration Time header and accompanying metadata information to the proper mail exchange servers and ultimately to the correct destination server. The systems, methods and computer program products of the present disclosure may also reside in the various mail exchange servers that route the email message from the originating server to the destination server.

Figure 2:
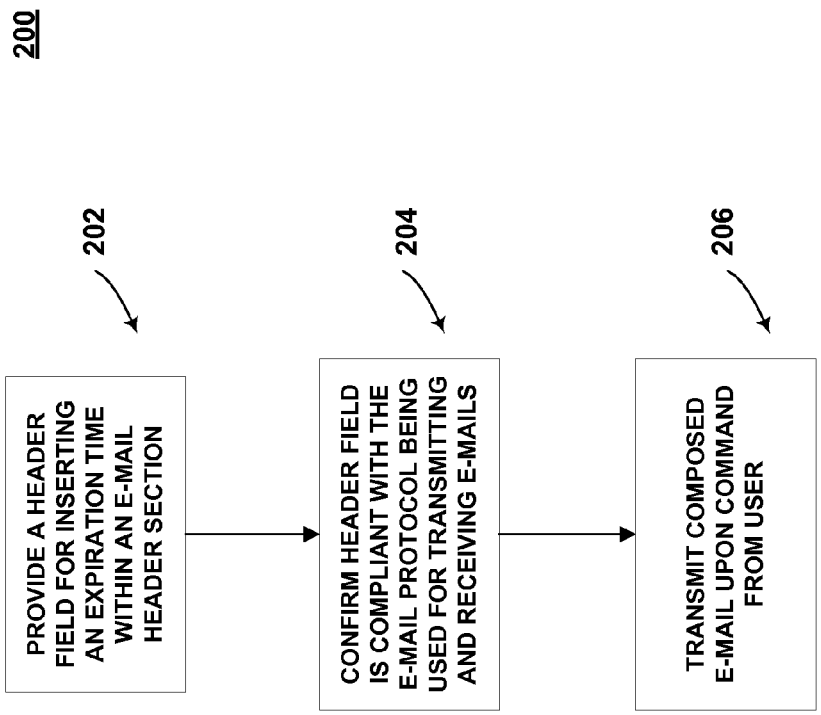
FIG. 2 is a flow chart depicting the steps for transmitting email messages as per the systems, methods and/or computer program products of the present disclosure.

Referring now to FIG. 2, and continuing on with the example of user A composing an email message and transmitting it to user B, an email message transmission process 200 according to an embodiment is shown. In such an embodiment, process 200 is performed by programmed software executing on laptop 102. In step 202, laptop 102, operating under a computer program that contains instructions to implement the method of transmitting emails, provides a user accessible header field to user A called Expiration Time during the composition of the email by user A. The format of the email message is executed as per an email transmission protocol such as the SMTP. The email has a body section and a header section. The header section has one or more header fields. In accordance with the present disclosure, at least one of the header fields is the Expiration Time header. The Expiration Time header field is accessible to user A and allows user A to enter a value for the Expiration Time field where, in an embodiment, the value is represented by an integer N which is equal to 1 or greater. In such an embodiment, N represents number of days for the Expiration Time.

It will be readily understood that the Expiration Time header field can be used to represent more refined time periods. For example, a format for the Expiration Time value may be N, J, K where N, J, and K are integers equal to 1 or greater, and where N represents number of days, J represent number of hours and K represents number of minutes. Various other formats and precision for the Expiration Time value can be used (e.g., a character string in the form of "YYYY-MM-DDThh:mmTZD", where YYYY=four-digit year; MM=two-digit month (01=January, etc.); DD=two-digit day of month (01 through 31); hh=two digits of hour (00 through 23); mm=two digits of minute (00 through 59); and TZD=Coordinated Universal Time (UTC) time zone designator (Z or +hh:mm or -hh:mm)—according to the W3C date and time format standard, a subset of the W3C standard time format string, or the like).

In an embodiment, user A may have the capability of making the Expiration Time header field readable only; this means that a recipient of the email can view the Expiration Time, but is not able to modify the value of the Expiration Time. Further, user A may be capable of preventing the composed email from being transferred to any folder and can simply reside only within the Inbox folder, which is the folder that received the email.

In step 204, the user equipment (e.g., laptop 102) checks the user-entered value to confirm that the user entered value has the proper format and that it is compliant with the protocols being followed. An improper value or a value not following the proper format will cause the user equipment (i.e., laptop 102) to inform user A to correct the entered value to the right format. The method of the present disclosure will not allow the email to be transmitted unless the Expiration Time field is left blank or a proper value with a proper format is entered by user A. When the user accessible header field is left blank, the method of the present disclosure inputs a default value for the Expiration Time header field. An example of a default value is N years (where N is sufficiently large) or "NEVER"—meaning that the email will not be automatically deleted by the intended destination server (unless the receiving user has the ability to modify or reset the Expiration Time header field or simply manually deletes the email in a conventional manner).

In step 206, the properly-formatted email, including the Expiration Time header field, is transmitted as per the various appropriate protocols upon a command from user A (e.g., clicking/selecting/tapping a "send" button). That is, the method of the present disclosure for transmitting emails as implemented with programmed laptop 102 confirms the format of the email including the format of the Expiration Time header field and then waits for a transmit command. The transmit command originates from user A who, for example, can activate a Send email command. The Send email command may be part of the composed email, which may, for example, be graphically presented on the display of laptop 102. Upon receipt of the Send email command, laptop 102 transmits the email in accordance with various applicable protocols including the SMTP.

The email has now been transmitted from laptop 102 to ISP server 108, which transmits it to the Internet via communication link 112 where it is routed in accordance with the SMTP and other protocols through various mail exchange servers. As mentioned earlier, instead of laptop 102, ISP server 108 (or some other processor) can be programmed with the method of the present disclosure to enable server 108 (or some other processor) to transmit an email that includes an Expiration Time header field as described above.

Figure 3:
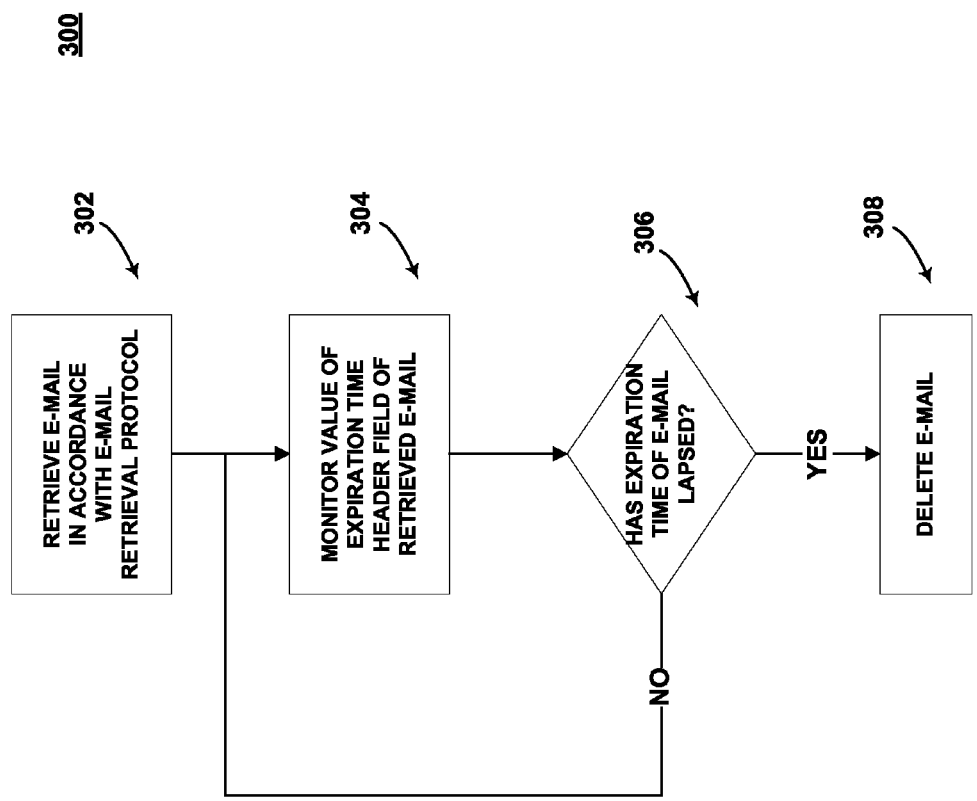
FIG. 3 is a flow chart depicting the steps for receiving and processing email messages as per the systems, methods and/or computer program products of the present disclosure.

Referring now to FIG. 3, and still continuing with the example of user A transmitting an email to user B, an email receiving process 300, according to an embodiment, is shown. The email message having been transmitted through Internet 114 has now reached its destination and is residing in ISP server 118. For ease of explanation, process 300 is described in the context of the IMAP and may be performed by laptop 124, which has a commercial email software program installed within it for transmitting and retrieving emails. That is, the method of processing a received email can be a separate program that interacts with the installed commercial software or can be merged with and become integral with the installed commercial software. Alternatively, process 300 may be performed by server 118, which is programmed to recognize the Expiration Time header field in the received email and use the time the email was received as a reference point for the Expiration Time. That is, an Expiration Time clock will start to run at the time the email is received by server 118. Server 118 places the received email in a folder (i.e., the "Inbox" folder). The folder is replicated at laptop 124 with the use of a commercial email software package and such folder is synched to its corresponding folder on server 118. An email folder appearing at laptop 124, which is synched to server 118, is controlled by server 118. Any action, modification or alteration done to the folder in the server will be reflected in the corresponding folder being displayed by laptop 124. Conversely, any action, modification or alteration done to the folder on laptop 124 will be reflected in the corresponding folder on server 118.

In step 302, server 118 retrieves the email in accordance with the IMAP. Once the email is retrieved by server 118, it is accessible to user B who can retrieve the email from the Inbox of their email reader software application executing on laptop 124. That is, the received email, as per the IMAP, is downloaded into an Inbox folder that is replicated at laptop 124 so that the Inbox being displayed at laptop 124 (upon activation of the email software installed in laptop 124) is synched to server 118. User B can then open the email to view the header section and body section contents of the email message. The email as displayed by laptop 124 has the typical header section comprising the following header fields: From: sender email address; To: recipient email address; Date: date and time email is sent; Subject: subject matter of email; and CC: additional recipient email addresses. In addition to the aforementioned email header fields, a field displayed as Expiration Time (e.g., N days, J hours and/or K minutes, or any other date/time format) is also displayed. Thus, the Expiration Time header field functions to: (i) inform user B of the length of time the email will reside on server 118 until automatic deletion occurs; (ii) give user B the option to modify the value of the Expiration Time field (if allowed by the sender (i.e., user A); and (iii) give user B the option to move the received email to a folder that is not synched to ISP server 118.

In an embodiment, if the user moves the received email to a folder that is not synched to ISP server 118, or if the user modifies the value of the Expiration Time header field to a default value of "NEVER", then the received email will not be automatically deleted by server 118 and will remain on the server indefinitely. If the received email remains in a folder synched with server 118, however, then it will ultimately be automatically deleted. While the email remains in a synched folder, its Expiration Time is decreased in equal incremental steps (e.g., seconds, minutes, hours or days) and the remaining time is continuously displayed and is made available to user B when viewing the email. Thus, server 118 keeps track of the continuously changing value of the Expiration Time.

In another embodiment of the present disclosure, the sender of the email may be so concerned with the sensitive information within the email that the Expiration Time field would be set as read-only and the receiving user would not be able to modify the value of the Expiration Time nor would the user be able to move the received email to a folder not in synchronization with server 118. In yet another embodiment, the sender may be able to move the email to a private folder, but may still not be able to modify, alter or change in any fashion the value of the Expiration Time field. In this case, if the email is somehow removed from a private folder and is stored back into a folder synched with the server, the Expiration field will be reactivated and its countdown toward its ultimate deletion will be resumed by the present disclosure.

In step 304, server 118 periodically monitors (or scans) the email (and all other emails in synched folders) to determine the status of its Expiration Time at any system-specified interval. The value of the Expiration Time can be changed and/or modified by user B at any time prior to the lapsing of the Expiration Time. Server 118 will continue to monitor the value of the Expiration Time and will automatically delete the email when its Expiration Time has lapsed.

In particular, in step 306, server 118 is attempting to detect the event of the lapsing of the Expiration Time. In step 308, upon the detection of the lapsing of the Expiration Time, server 118 automatically deletes the received email. Server 118 as described above is able to perform the method of processing a received email due to the installation of software and/or computer program products that embody the method as described in FIG. 3 onto server 118. The same software can be installed on laptop 124 to allow laptop 124 to perform process 300. Alternatively, the program may be installed in both server 118 and laptop 124 to allow either device to perform the method of processing a received email. Further, it will be readily understood that both laptop 102 and 124 are capable of performing the systems, methods and computer program products of the present disclosure as depicted in FIGS. 1 and 2. Also, both ISP servers 108 and 118 are capable of performing the systems, methods and/or computer program products of the present disclosure as depicted in FIGS. 1 and 2.

Figure 4:
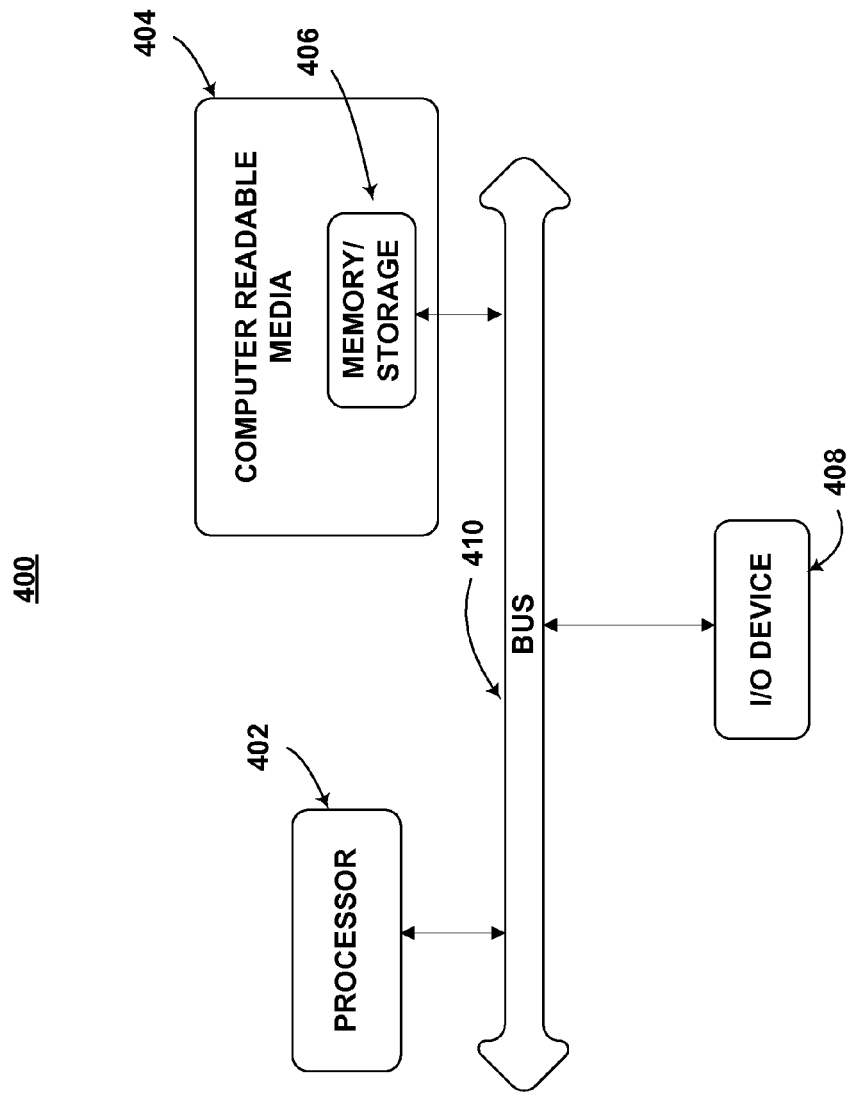
FIG. 4 is a block diagram of an example computing device that can be configured to implement one or more embodiments of the present disclosure.

Referring to FIG. 4, a block diagram of an example computing device 400 that can be configured to implement various aspects of time-managing emails, in accordance with one or more embodiments of the present disclosure, is shown. Computing device 400 may implement process 200 and/or process 300 within laptop 102, 124 and/or server 108, 118.

Computing device 400 includes one or more processors or processing units 402, one or more computer readable media 404 which can include one or more memory and/or storage components 406, one or more input/output (I/O) devices 408, and a bus 410 that allows the various components and devices to communicate with one another. Computer readable media 404 and/or one or more I/O devices 408 can be included as part of, or alternatively may be coupled to, computing device 400. Bus 410 represents one or more of several types of bus structures, including a memory bus or memory controller, a peripheral bus, an accelerated graphics port, a processor or local bus, and so forth using a variety of different bus architectures. Bus 410 can include wired and/or wireless buses.

Memory/storage component 406 represents one or more computer storage media. Component 406 can include volatile media (such as random access memory (RAM)) and/or nonvolatile media (such as read only memory (ROM), Flash memory, optical disks, magnetic disks, and so forth). Component 406 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 402. It is to be appreciated that different instructions can be stored in different components of computing device 400, such as in a processing unit 402, in various cache memories of a processing unit 402, in other cache memories of device 400 (not shown), on other computer readable media, and so forth. Additionally, it is to be appreciated that the location where instructions are stored in computing device 400 can change over time.

One or more input/output devices 408 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry, system on a chip), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices. The features of the present disclosure described herein are platform-independent, meaning that the techniques can be implemented on a variety of commercial computing platforms having a variety of processors.

As will be apparent to one skilled in the relevant art(s) after reading the description herein, code implementing process 200 and process 300, that facilitate the automatic deletion of received emails after a user-selectable time period, may be part of the "standard" email reader application that ships with computing device 400 or may be later added as part of a update (or patch).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A computing system having one or more processors and one or more computer storage devices stored thereon multiple instructions that when executed by the one or more processors, causing the one or more processors to perform a method comprising:
    receiving an email and placing a first copy of the received email in a first folder maintained on the computing system, the received email having an associated value of expiration, wherein the value represents a time period for which the first copy of the email is maintained in the first folder prior to deletion;
    transmitting a second copy of the email to be displayed in a second folder appearing on a client device, the second folder being synchronized with the first folder;
    determining (i) if the time period corresponding to the value of expiration is lapsed and (ii) if the second copy of the email is still displayed in the second folder appearing on the client device; and
    in response to determining (i) that the time period corresponding to the value of expiration has lapsed and (ii) that the second copy of the email is still displayed in the second folder appearing on the client device, automatically deleting the first copy of the email from the first folder.

2. The computing system of claim 1, wherein the method performed by the one or more processors further includes receiving an input for modification of the value of expiration from a recipient and modifying the value of expiration according to the received input for modification.

3. The computing system of claim 1, wherein the value of expiration comprises at least one of an integer representing a number of days, an integer representing a number of hours, an integer representing a number of minutes, a character string representing a specific date, a character string representing a specific time, or a default value.

4. The computing system of claim 1, wherein the method performed by the one or more processors further includes in response to determining (i) that the time period corresponding to the value of expiration has lapsed and (ii) that the second copy of the email is not displayed in the second folder appearing on the client device, maintaining the first copy of the received email in the first folder.

5. A method for processing electronic mails, comprising:
    receiving, at a server, an electronic mail with an associated value of expiration indicating a time period for which the electronic mail is maintained on the server;
    storing a copy of the received electronic mail in a folder on the server, the folder being accessible by a client device in electronic communication with the server to display a copy of the received electronic mail;
    determining (i) if the time period indicated by the value of expiration is lapsed and (ii) if the copy of the received electronic mail is still in the folder accessible by the client device; and
    in response to determining (i) that the time period indicated by the value of expiration is lapsed and (ii) that the copy of the received electronic mail is still in the folder accessible by the client device, automatically deleting the stored copy of the received electronic mail from the folder on the server.

6. The method of claim 5, further comprising in response to determining that the time period indicated by the value of expiration is not lapsed, maintaining the first copy of the received electronic mail indefinitely in the first folder on the server.

7. The method of claim 5, further comprising:
   detecting restoration of the copy of the electronic mail to the folder displayed on the client device; and
   in response to the detected restoration of the copy,
   determining if the time period indicated by the value of expiration is lapsed; and
   in response to determining that the time period indicated by the value of expiration is lapsed, automatically deleting the copy of the received electronic mail from the folder on the server.

8. The method of claim 5, further comprising receiving an input for modification of the value of expiration from a recipient at the client device and modifying the value of expiration according to the received input for modification.

9. The method of claim 5, wherein the value of expiration comprises at least one of an integer representing a number of days, an integer representing a number of hours, an integer representing a number of minutes, a character string representing a specific date, or a character string representing a specific time.

10. The method of claim 5, further comprising in response to determining (i) that the time period indicated by the value of expiration is not lapsed and (ii) that the copy of the received electronic mail is still in the folder accessible by the client device, determining a remaining time of the time period indicated by the value of the expiration.

11. A computing system, comprising:
    a processor; and
    a memory containing instructions that when executed by the processor cause the processor to perform a process comprising:
    receiving an electronic mail with an associated value of expiration indicating a time period for which the electronic mail is maintained on the computing system;
    storing a copy of the received electronic mail in a folder on the computing system, the folder being accessible and displayable by a client device in electronic communication with the computing system;
    determining (i) if the time period indicated by the value of expiration is lapsed and (ii) if the copy of the received electronic mail is still in the folder accessible by the client device; and
    in response to determining (i) that the time period indicated by the value of expiration is lapsed and (ii) that the copy of the received electronic mail is still in the folder accessible by the client device, automatically deleting the copy of the received email from the folder on the computing system.

12. The computing system of claim 11 wherein the process performed by the processor further includes in response to determining (i) that the time period indicated by the value of expiration is not lapsed and (ii) that the copy of the received electronic mail is in the folder, maintaining the copy of the received electronic mail in the folder on the computing system.

13. The computing system of claim 11 wherein the process performed by the processor further includes:
    detecting restoration of the copy to the folder; and
    in response to the detected restoration of the copy to the folder,
    determining if the time period indicated by the value of expiration is lapsed; and
    in response to determining that the time period indicated by the value of expiration is lapsed, automatically deleting the copy of the received email from the folder on the computing system.

14. The computing system of claim 11 wherein the process performed by the processor further includes receiving an input for modification of the value of expiration from a recipient at the client device and modifying the value of expiration according to the received input for modification.

15. The computing system of claim 11 wherein the process performed by the processor further includes:
    receiving an input for modification of the value of expiration from a recipient at the client device;
    determining if the value of expiration is modifiable; and
    in response to determining that the value of expiration is modifiable, modifying the value of expiration according to the received input for modification.

16. The computing system of claim 11 wherein the process performed by the processor further includes:
    receiving an input for modification of the value of expiration from a recipient at the client device;
    determining if the value of expiration is modifiable; and
    in response to determining that the value of expiration is not modifiable, maintaining the current value of expiration.

17. The computing system of claim 11 wherein the value of expiration comprises at least one of an integer representing a number of days, an integer representing a number of hours, an integer representing a number of minutes, a character string representing a specific date, or a character string representing a specific time.

18. The computing system of claim 11 wherein the process performed by the processor further includes in response to determining that the time period indicated by the value of expiration is not lapsed, determining a remaining time of the time period indicated by the value of the expiration.

19. The computing system of claim 11 wherein the process performed by the processor further includes in response to determining that the time period indicated by the value of expiration is not lapsed, determining a remaining time of the time period indicated by the value of the expiration, wherein the determined remaining time is to be displayed to a user via the client device.

20. The computing system of claim 11 wherein the folder is an inbox folder on the computing system, and wherein:
    determining if the copy of the received electronic mail is still in the folder accessible by the client device includes determining if the copy of the received electronic mail is still in the inbox folder accessible by the client device; and
    in response to determining (i) that the time period indicated by the value of expiration is lapsed and (ii) that the copy of the received electronic mail is still in the inbox folder, automatically deleting the copy of the received email from the inbox folder on the computing system.

* * * * *